United States Patent Office 3,495,034
Patented Feb. 10, 1970

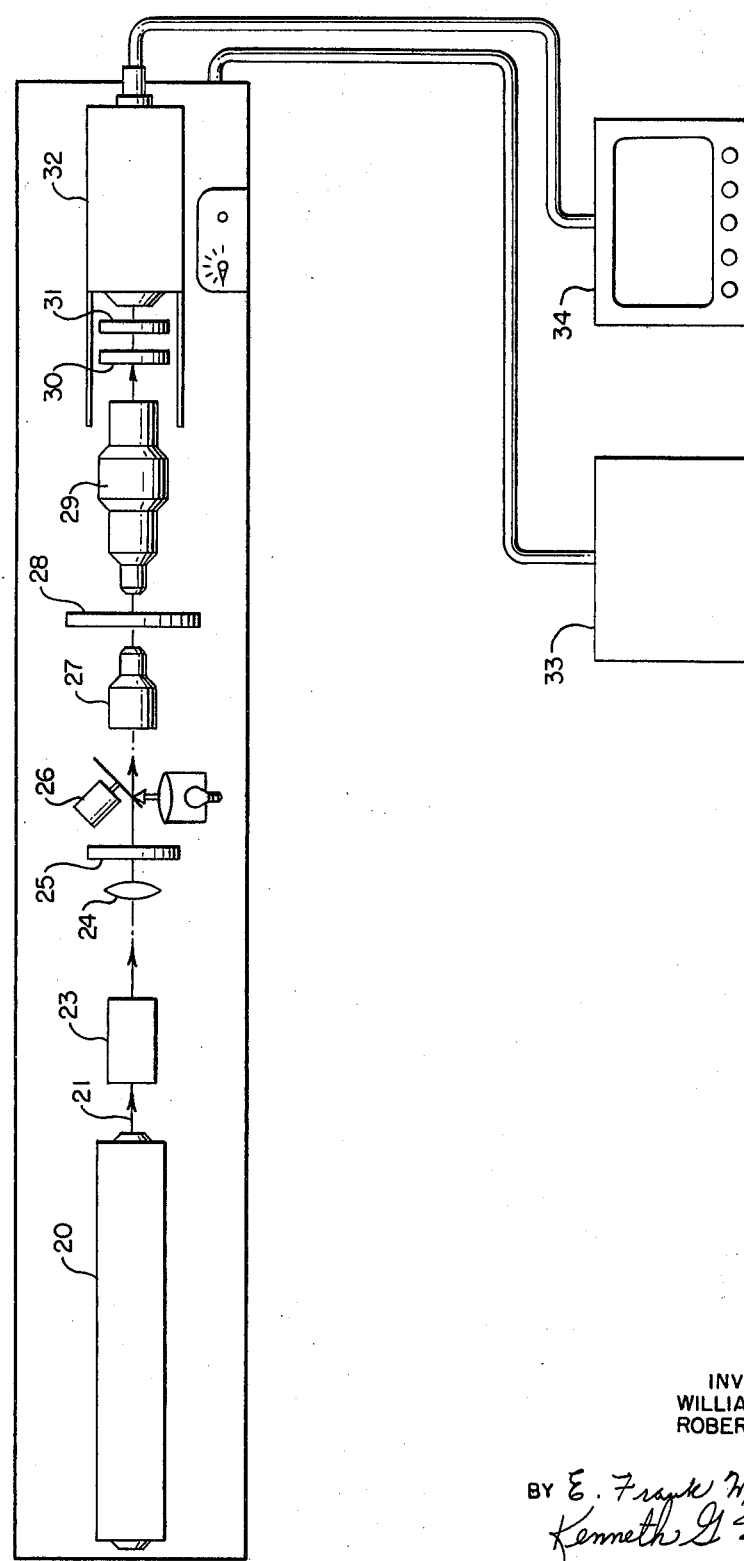

3,495,034
PHOTOCHROMIC DISPLAY SYSTEM USING LASER
Robert K. Arend, Xenia, and William R. Horst, Dayton, Ohio, assignors to The National Cash Register Company, Dayton, Ohio, a corporation of Maryland
Filed Mar. 30, 1967, Ser. No. 627,186
Int. Cl. H04n 5/76
U.S. Cl. 178—6.8
9 Claims

ABSTRACT OF THE DISCLOSURE

A system whereby a plate having a coating thereon containing activated, or colored, photochromic compounds is decolored or "erased" by a laser beam in discrete images or characters so that the etiolated areas conform to information to be viewed or transmitted by a television camera.

---

This invention relates to an optical display device and more particularly to such a device in which the information to be displayed is delineated by a laser beam in etiolated areas of plate having a coating containing an activated colored photochromic compound of the structure:

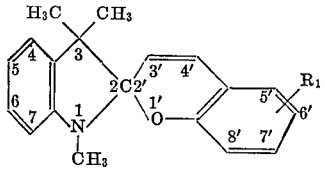

wherein $R_1$ represents independently-selected substituent radicals in at least three of substituent positions 5', 6', 7', and 8', said substituent radicals being selected from the group consisting of $-NO_2$, $-OCH_3$, $-Cl$, $-Br$, $-I$, and $-F$, the substituents at said positions consisting of (a) at least one but no more than two $-NO_2$ groups, and (b) at least one of the foregoing radicals other than the $-NO_2$ radical, said etiolation, or decoloration being effected by a monochromatic absorption at the laser wavelength by a normally colored photochromic compound, i.e., selected portions of the plate may be "erased" by exposure to a laser beam. More importantly, the change of state occurs at a molecular level such that the photochromatic film has very high resolution characteristics and is capable of receiving images which have been reduced in size by a factor of greater than 200 to 1 (corresponding to an areal reduction of 40,000 to 1).

It is an object of this invention to provide an optical display device which utilizes a laser beam which is deflected in accordance with the information to be displayed and limns such information in terms of etiolated or decolored images in an image plate comprising a translucent support and a coating thereon comprising a colored, or activated, photochromic compound.

Another object of this invention is to provide a novel signal recording apparatus utilizing laser beam writing means.

A still further object of the present invention is to provide a novel laser beam recording apparatus to provide a visually contrasting record.

Other objects of this invention will become apparent from the following description taken in connection with the accompanying drawing. The figure is a schematic drawing illustrating the preferred embodiment of this invention.

A major feature of the present invention resides in a system including a high resolution photochromatic plate containing light sensitive dyes and capable of receiving a plurality of substantially reduced images.

As employed in this disclosure, the term image refers to an image reduced by a factor of greater than 100 to 1 and the term photochromatic material refers to a translucent or transparent material containing a molecular dispersion of reversible light sensitive dyes which becomes opaque on exposure to radiation in the blue-ultraviolet portion of the electromagnetic spectrum. The material is of the type wherein the opaque condition can be quenched or erased either by natural reversal or by a reversal induced by applied energy such as heat and/or light. Such a photochromatic material exhibits excellent resolution capabilities.

Referring to the figure in more detail, there is shown a laser beam optical display device having a laser source 20 which is effective to produce a coherent laser beam 21. The laser source 20 may be any device for producing a high energy coherent beam of radiation at either a high repetition rate or a continuous output, such devices being well-known in the art. The laser may typically be a conventional continuous-wave laser oscillating in a single transverse mode and emitting a uniphase wavefront laser beam with a divergence which is preferably diffraction limited so as to permit optimum use of the laser power output. An available laser of this type is a helium-neon gas laser manufactured by the Perkin-Elmer Company, Norwalk, Connecticut, having a power output of approximately 50–70 milliwatts, a wavelength of 6328 angstroms, and a beam divergence of approximately 0.5 milliradian. As illustrated in the figure, laser 20 emits a high energy, collimated, monochromatic, linearly polarized output laser beam 21.

The shutter 23 controls the impinging of the beam 21 onto the photographic mask 25. This shutter is opened instantly and momentarily upon the movement of the mask into a position corresponding to an input command from command information source 33. In this fashion, the image, or character, limned in that part of the mask 25 coincident with the laser beam 21 will appear uncolored, or etiolated, on the photochromic plate 28.

The lens 24 is used to focus laser beam 21. Lens 24 should be adjusted to produce as fine a beam as possible, both to concentrate the energy and to control the size of the image on the photochromic plate 28. If desired, a larger trace can be achieved by a slight defocussing of the lens.

The photographic mask 25 is controlled by command information received from command information source 33. The mask 25 is positioned by means set forth in application for U.S. Patent, S.N. 627,541, filed Mar. 31, 1967, by Melvin T. Roudebush. The mask 25 is so constructed that the material of the mask delineates characters and images, the mask 25 thereby acts as a template or stencil with respect to the laser beam 21 and the photochromic plate 28. As shown in the aforementioned application S.N. 627,541, each of the characters delineated by the mask is assigned a binary number, which binary number indicates the position of the character delineation in the mask. The command information source 33 includes a keyboard (not shown). Each key of the keyboard corresponds to a character delineation of the mask. The depression of a key on the keyboard activates solenoids on each opposite side of the mask 25 in a push-pull manner to position the mask 25 such that the portion of laser beam 21 that does not define the image of the desired character is deflected by mask 25.

The chopper 26 is a motor driven baffle or screen to interrupt laser beam 21 to effect a pulsing, or interrupted laser beam. The purpose of this chopper is to provide a light source for a television camera. Lens 27 is a conventional reducing lens.

The photochromic plate 28 comprises a major feature of this invention. The term photochromic material herein comprises those activated colored compounds of the structure

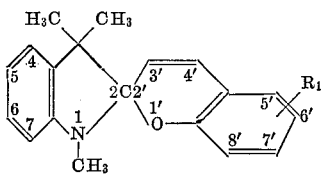

wherein $R_1$ represents independently-selected substituent radicals in at least three of substituent positions 5', 6', 7', and 8', said substituent radicals being selected from the group consisting of $-NO_2$, $-OCH_3$, $-Cl$, $-Br$, $-I$, and $-F$, the substituents at said positions consisting of (a) at least one but no more than two $-NO_2$ groups and (b) at least one of the foregoing radicals other than the $-NO_2$ radical.

These derivative compounds have two color-absorption states and a colorless state, in which the 2'-1' spiro-carbon to oxygen bond is broken. These compounds are crystalline solids at room temperature and exhibit a light yellowish color in the colorless state and an orange-red color in the colored state. In liquid solution, the compounds in the colorless state have no substantial color, but in the colored state appear red-orange in ethanol and red in toluene.

The parent compound

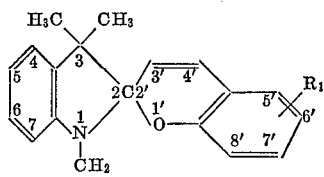

with which this invention is not concerned, and the derivatives thereof which are claimed herein, all have the property of being converted, in solution, from the colored state to the colorless state when subjected to electromagnetic radiation predominating in visible components and reversely convertible from the colorless state to the colored state when subjected to electromagnetic radiation predominating in ultraviolet components.

The preparation of compounds suitable for use in this novel laser erasing system is set forth in U.S. Patent No. 2,953,454, which issued Sept. 20, 1960, to Elliot Berman, U.S. Patent No. 2,978,462, which issued Apr. 4, 1961, to Elliot Berman and David B. McQuain, and U.S. Patent No. 3,100,778, which issued Aug. 13, 1963, to Elliot Berman.

Because of the extremely high resolution capabilities of photochromatic films, great image reduction allows for very high density storage (imagine reduction of 200 to 1 as mentioned herein is merely for practical consideration and image reductions by a factor of 300–400 to 1 are easily obtainable).

The colored form of some dyes is resistant to "erasing" light at room temperature or other ambient temperature, so that, when a layer contains such dye, it will not be erased when exposed to "erasing" light. Where a layer of the screen has a mixture of dye solutions therein, one "erasable" by "erasing" light, and the other not, the erasable one of the solution components of a layer may be "erased" by "erasing" light, regardless of the other components or layers.

As a specific example of photochromic material, a film may be formed by solidification of a poured mixture of the following, the proportions being in terms of parts by weight:

Nitrocellulose (as sold by Hercules Powder Co.,
    Wilmington, Del.) _____ 10.0
Dibutyl phthalate _____ 5.0
Ethyl alcohol _____ 10.0
Butyl acetate _____ 25.0
Toluene _____ 50.0

Ninety-nine parts, by weight, of the above solution was mixed with one part, by weight, of 1,3,3-trimethyl-indoline - 5'-bromo-6'-methoxy-8'-nitrobenzopyrylospiran. Using a coating bar technique, a wet film approximately 0.0025 inch thickness was deposited on a glass substrate. After evaporation of the solvents (butyl, toluene and ethanol), the dry clear film remaining on the glass was approximately 0.0001 inch thick.

Glass has been mentioned as a support material, but there are many obvious light-transmitting film substitutes therefor, such as polymethyl-methacrylate, polystyrene, and the like, that will transmit the necessary wave lengths of light.

Because of the low photo sensitivities of photochromatic materials, relatively high intensity light sources are required for reasonably fast erasing exposures and lower intensity light sources can be used to project an image thus stored without undue quenching of the image. Thus, by taking into account the energies involved, a system can be designed to permit thousands of readouts before severe loss of contrast in the image occurs. Furthermore, the photochromic material can be reversibly switched between the transmitting and absorbing states at least 1000 times before material fatigue begins to set in.

In this fashion, graphic information generated by command information source 33 may be instantaneously scribed on plate 28. In view of the fineness of the output beam of the laser, the erased or etiolated line is extremely sharp and a considerable amount of information can be precisely scribed on a relatively small surface area.

The information scribed on plate 28 can be displayed a screen either as it is being scrivened on plate 28 or subsequent thereto. Such a display may be achieved by a conventional optical system including lenses 29, 30 and 31.

In the preferred embodiment, the information etiolated on plate 28 is viewed by a television camera, the reading by the television camera 32 being achieved by use of a conventional optical system including lenses 29, 30 and 31.

The device of this invention thus provides a simple yet highly effective technique for transcribing graphic and alpha numeric information on an image plate, such information being suitable for large scale display. The device of the invention further has high speed readout capabilities and is readily adaptable for utilization in a multicolor display.

While the invention has been described and illustrated in detail, it is clearly to be understood that this is intended by way of illustration and example only and is not to be taken by way of limitation, the spirit and scope of this invention being limited only by the terms of the following claims.

What is claimed is:
1. An optical display device comprising means for generating an intense concentrated beam of energy in the frequency from ultraviolet through infra-red,
    a command signal source,
    an image plate having a colored coating comprising at least one activated photochromic compound of the structure:

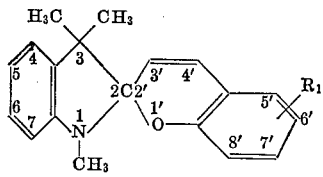

wherein $R_1$ represents independently-selected substituent radicals in at least three of substituent positions 5', 6', 7', and 8', said substituent radicals being selected from the group consisting of —$NO_2$, —$OCH_3$, —Cl, —Br, —I, and —F, the substituents at said positions consisting of (a) at least one but no more than two —$NO_2$ groups, and (b) at least one of the foregoing radicals other than the—$NO_2$ radical, means responsive to said command signal source for causing said light beam to impinge on said image plate, whereby said light beam decolors said coating to form images in accordance with the output of said command signal source.

2. An optical display device comprising:

means for generating an intense concentrated beam of energy in the frequency range from ultraviolet through infra-red, a command signal source, means for deflecting portions of said beam in response to said command signal source, and an image plate having a colored coating comprising at least one excited photochromic compound of the structure:

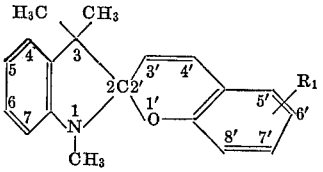

wherein $R_1$ represents independently-selected substituent radicals in at least three of substituent positions 5', 6', 7', and 8', said substituent radicals being selected from the group consisting of —$NO_2$, —$OCH_3$, —Cl, —Br, —I, and —F, the substituents at said positions consisting of (a) at least one but no more than two —$NO_2$ groups, and (b) at least one of the foregoing radicals other than the —$NO_2$ radical, means responsive to said command signal source for causing said light beam to impinge on said image plate, whereby said light beam etiolates said colored coating to form colorless images in accordance with the output of said command signal source.

3. The device as recited in claim 2 wherein said means for generating said intense concentrated beam is a laser.

4. An optical display device comprising:

laser means for generating an intense, highly concentrated, monochromatic beam, an image plate having a coating thereon, said coating comprising the colored form of at least one photochromic compound having the structural formula:

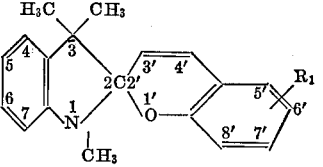

wherein $R_1$ represents independently-selected substituent radicals in at least three of substituent positions 5', 6', 7', and 8', said substituent radicals being selected from the group consisting of —$NO_2$, —$OCH_3$, —Cl, —Br, —I, and —F, the substituents at said positions consisting of (a) at least one but no more than two —$NO_2$ groups, and (b) at least one of the foregoing radicals other than the —$NO_2$ radical, optical means for causing said beam to impinge on said image plate, stenciling means for deflecting portions of said beam, a command signal source for controlling said stenciling means, whereby said stenciled beam etiolates a pattern on said image plate in accordance with the output of said command signal source.

5. In an optical display device an image plate having a coating thereon comprising the colored form of an activated photochromic compound of the structure

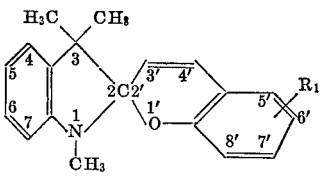

wherein $R_1$ represents independently-selected substituent radicals in at least three of substituent positions 5', 6', 7', and 8', said substituent radicals being selected from the group consisting of —$NO_2$, —$OCH_3$, —Cl, —Br, —I, and —F, the substituents at said positions consisting of (a) at least one but no more than two —$NO_2$ groups, and (b) at least one of the foregoing radicals other than the —$NO_2$ radical, a command signal source, and means for quenching an image on said plate in accordance with the output of said command signal source, said means comprising a monochromatic laser beam.

6. The optical display device of claim 5 in which the photochromic compound is 1,3,3 - trimethylindoline - 5'-bromo-6'-methoxy-8'-nitrobenzopyrylospiran.

7. A cathode image display control device including in combination (a) A photochromic filter normally in a colored state generally non-transparent to visible light but which is erasable to a transparent condition wherever subjected to a laser beam;

(b) An iconoscope-cathode ray display system activated by visible illumination to display on a cathode ray activatable screen any desired input data;

(c) Means to direct a laser beam in a controlled manner against the filter (a) to erase it in a desired area to represent data in terms of transparency to visible light;

(d) Visible light means for directing a visible light beam against the filter (a), and (e) Chopper means for directing the controlled laser beam and then the visible light beam against the filter, whereby information appears on the image plate and the cathode ray screen.

8. A method of scrivening for television reception comprising the formation of a large plurality of individual, high resolution, colorless images on an image plate having thereon a coating comprising a photochromic compound having the structure:

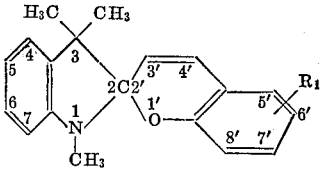

wherein $R_1$ represents independently-selected substituent radicals in at least three of substituent positions 5′, 6′, 7′, and 8′, said substituent radicals being selected from the group consisting of —$NO_2$, —$OCH_3$, —Cl, —Br, —I, and —F, the substituents at said positions consisting of
(a) at least one but no more than two —$NO_2$ groups and
(b) at least one of the foregoing radicals other than the —$NO_2$ radical,
said method comprising the steps of:
(a) activating said photochromic coating with ultraviolet radiation to a colored form thereof,
(b) forming a laser beam,
(c) directing said laser beam onto said colored image plate and
(d) simultaneously, optically transmitting said colorless images to a television camera.

9. The method of claim 8 wherein the photochromic compound is 1,3,3 - trimethylindoline-5′-bromo-6′-methoxy-8′-nitrobenzopyrylospiran.

References Cited
UNITED STATES PATENTS

| | | | |
|---|---|---|---|
| 3,253,497 | 5/1966 | Dreyer | 88—1 |
| 3,322,033 | 5/1967 | Silverman | 88—24 |
| 3,359,563 | 12/1967 | Stetten | 346—76 |

JOHN W. CALDWELL, Primary Examiner

R. L. RICHARDSON, Assistant Examiner

U.S. Cl. X.R.

178—6.6, 7.2; 260—326.11; 346—74; 350—160

UNITED STATES PATENT OFFICE
CERTIFICATE OF CORRECTION

Patent No. 3,495,034             Dated: February 10, 1970

Inventor: Robert K. Arend, et al.

It is certified that error appears in the above-identified patent and that said Letters Patent are hereby corrected as shown below:

Column 3, first structural formula, the numeral 3 should be inserted as follows --- [structural formula with $H_3C$, $CH_3$, 3, $2C_2'$, N, $CH_3$] ---.

Column 3, second structural formula " [N with $CH_3$] " should be --- [N with $CH_2$] ---.

Column 3, line 67, "imagine" should be ---image---. Column 4, line 22, after "butyl", insert ---acetate---. Column 4, line 47, insert ---on--- after "displayed". Column 5, Claim 4, the structural formula " [N with $CH_3$] " should be --- [N with $CH_3$] ---.

SIGNED AND SEALED
JUL 7 1970

(SEAL)
Attest:

Edward M. Fletcher, Jr.
Attesting Officer

WILLIAM E. SCHUYLER, JR.
Commissioner of Patents